J. E. SPENCER.
Metal Turning-Lathes.
No. 150,094. Patented April 21, 1874.
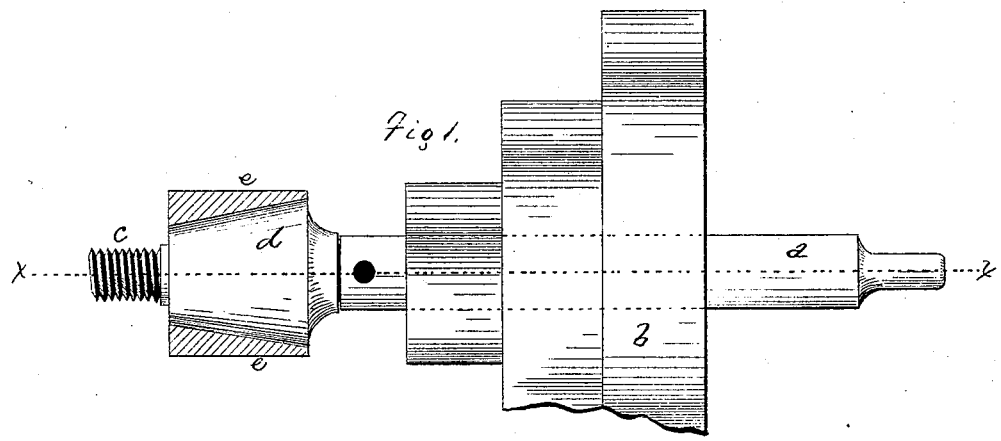
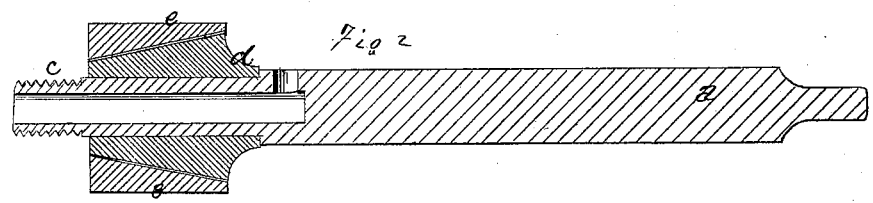
WITNESSES.
INVENTOR.

UNITED STATES PATENT OFFICE

JOHN E. SPENCER, OF MOODUS, CONNECTICUT.

IMPROVEMENT IN METAL-TURNING LATHES.

Specification forming part of Letters Patent No. 150,094, dated April 21, 1874; application filed April 13, 1874.

*To all whom it may concern:*

Be it known that I, JOHN E. SPENCER, of Moodus, in the county of Middlesex and State of Connecticut, have invented certain new and useful Improvements in Lathe - Spindles, of which the following is a specification, reference being had to the accompanying drawings, in which—

Figure 1 is a lathe-spindle, with my improved bearing. Fig. 2 is a view of the same in central longitudinal section.

The improvement consists in a hard cast-iron bearing for the steel shaft or spindle, which bearing is made separate from the shaft, then forced upon the shaft by pressure, so that when on, the shaft and the bearing are practically one.

In the drawings, the letter $a$ is the lathe-shaft or spindle, which is of soft untempered steel. $b$ is the ordinary cone-pulley; $c$, the screw upon the end for a face-plate; $d$, the hard cast-iron bearing, and $e$ the box in which the bearing runs. The bearing $d$ is in the form of a cone. Heretofore the whole shaft, bearing, and all have been made of one piece of steel, and after making, it was necessary to temper the large conical bearing. This process of tempering not unfrequently warped the shaft, so that it was useless, or so that it could not be made right without great trouble and expense. By making this bearing $d$ of a separate piece of hard cast-iron, I am enabled to leave the steel shaft soft and untempered and yet have a hard and durable bearing. Not only this, but when the cast-iron bearing does become worn, it can be cracked off and a new one put on. The shaft $a$ is turned down upon its front end, leaving a shoulder, against which the bearing $d$ is forced. This bearing is forced upon the shaft under considerable pressure, the same as car-wheels are forced upon their axles, and the bearing thus forced on becomes practically a part of the shaft.

I am aware that wagon-axles have been made having sleeves of babbitt or other soft metal thereon, and this I do not claim. I am also aware that wagon-axles of wrought-iron or steel have been made with spindles of a tapering form upon which, or wrought-iron thimbles have been placed as bearings for the hub of the wheel; but, since these spindles were tapering in form, such thimbles must have been held in place by other means than the contact of the thimble with the spindle, and such thimbles could not therefore become a unity with the spindle, and such unity is absolutely necessary in a lathe-spindle.

I claim as my invention—

A lathe-spindle of soft or untempered steel, having its bearing next the face-plate made of hard cast-iron, and forced upon a regular or non-tapering formation of the spindle, so as to become a unity with the spindle, substantially as and for the purpose set forth.

JOHN E. SPENCER.

Witnesses:
DAVID S. PURPLE,
RANSOM PIERCE.